United States Patent
Koh

(10) Patent No.: US 8,890,999 B2
(45) Date of Patent: Nov. 18, 2014

(54) METHOD AND SYSTEM FOR CONTROLLING EXTERNAL LENS

(75) Inventor: HongBin Koh, New Taipei (TW)

(73) Assignee: Altek Corporation, Hsinchu (TW)

( * ) Notice: Subject to any disclaimer, the term of this patent is extended or adjusted under 35 U.S.C. 154(b) by 198 days.

(21) Appl. No.: 13/220,690

(22) Filed: Aug. 30, 2011

(65) Prior Publication Data

US 2012/0188438 A1    Jul. 26, 2012

(30) Foreign Application Priority Data

Jan. 26, 2011  (TW) .............................. 100102946 A

(51) Int. Cl.
*H04N 5/225* (2006.01)
*H04N 5/232* (2006.01)

(52) U.S. Cl.
CPC ....... *H04N 5/23209* (2013.01); *H04N 5/23225* (2013.01)
USPC .......................................... 348/360; 348/361

(58) Field of Classification Search
CPC .................................................. H04N 5/23209
See application file for complete search history.

(56) References Cited

U.S. PATENT DOCUMENTS

| | | | |
|---|---|---|---|
| 2005/0237417 A1 | 10/2005 | Miyasaka | |
| 2008/0056696 A1* | 3/2008 | Wun | 396/56 |
| 2010/0066810 A1* | 3/2010 | Ryu et al. | 348/36 |
| 2010/0093399 A1* | 4/2010 | Kim et al. | 455/566 |
| 2010/0232779 A1* | 9/2010 | Okamoto et al. | 396/257 |
| 2010/0317410 A1* | 12/2010 | Song et al. | 455/566 |
| 2011/0050989 A1* | 3/2011 | Kim et al. | 348/374 |
| 2011/0109789 A1* | 5/2011 | Himuro et al. | 348/360 |
| 2011/0205383 A1* | 8/2011 | Shah | 348/222.1 |
| 2011/0249086 A1* | 10/2011 | Guo et al. | 348/14.12 |
| 2012/0019704 A1* | 1/2012 | Levey | 348/335 |
| 2012/0081553 A1* | 4/2012 | Cote et al. | 348/207.1 |
| 2012/0105490 A1* | 5/2012 | Pasquero et al. | 345/690 |
| 2012/0154633 A1* | 6/2012 | Rodriguez | 348/231.99 |
| 2013/0113977 A1* | 5/2013 | Yumiki | 348/333.08 |
| 2013/0265474 A1* | 10/2013 | Yoshida | 348/333.02 |

FOREIGN PATENT DOCUMENTS

| | | |
|---|---|---|
| CN | 2681484 | 2/2005 |
| CN | 1815461 | 8/2006 |

(Continued)

OTHER PUBLICATIONS

Office Action of China Counterpart Application, issued on Feb. 8, 2014, p. 1-p. 8.

(Continued)

*Primary Examiner* — Lin Ye
*Assistant Examiner* — John H Morehead, III
(74) *Attorney, Agent, or Firm* — Jianq Chyun IP Office

(57) ABSTRACT

A method and a system for controlling an external lens, applicable to a main device to control a lens module connected thereto, are provided. The main device provides power and storage medium for the lens module to use. In the present method, the lens module is connected to the main device, and a control program is downloaded from a memory unit of the lens module and installed in the main device. The control program is used to allow the main device to receive a control operation, accordingly control the lens module to execute a camera function, and finally display an execution result of the lens module executing the camera function.

13 Claims, 4 Drawing Sheets

(56) References Cited

FOREIGN PATENT DOCUMENTS

| | | |
|---|---|---|
| CN | 201039254 | 3/2008 |
| CN | 101750864 | 6/2010 |
| EP | 1850583 | 10/2007 |
| EP | 1903786 | 3/2008 |
| TW | I240538 | 9/2005 |

OTHER PUBLICATIONS

Office Action of Taiwan Counterpart Application, issued on Nov. 19, 2013, p. 1-p. 7.

* cited by examiner

METHOD AND SYSTEM FOR CONTROLLING EXTERNAL LENS

CROSS-REFERENCE TO RELATED APPLICATION

This application claims the priority benefit of Taiwan application serial no. 100102946, filed on Jan. 26, 2011. The entirety of the above-mentioned patent application is hereby incorporated by reference herein and made a part of this specification.

BACKGROUND OF THE INVENTION

1. Field of the Invention

The present invention relates to a method and system for controlling a camera. More particularly, the present invention relates to a method and system for a main device to control an external lens.

2. Description of Related Art

With the progress of the science and technology, traditional film cameras using films to record image are gradually replaced by the digital cameras using digital media to record image. Nowadays, the digital cameras are manufactured with minimized volumes to be portable, and also integrated with mobile phones to enable the mobile phones to have functions of making calls and taking pictures.

Digital cameras mainly consist of an optical lens module and a photosensitive device. Images can be focused on the photosensitive device through the focusing of the optical lens module. Then, an image signal is formed by inducing the intensity and color of light through the photosensitive device.

However, the demand for the portability of electronic device is getting higher in current market. The requirement for being thin and compact is increasingly higher for the portable electronic device such as mobile phones. This current trend limits the volume of portable electronic device and also the size of camera configured on the portable electronic device. Especially for the lens module, there is no extra room in the portable electronic device can be used to configure an optical zooming lens having a better imaging quality but a larger volume, and therefore an optical fixed-focus lens can only be configured. As a result, the camera function of portable electronic device is limited to provide users with ease to record images instantly but cannot provide images with quality similar to that of consumer digital cameras.

SUMMARY OF THE INVENTION

A method and system for controlling an external lens is provided in present invention. By installing the control program of the external lens in the electronic device and controlling the external lens by using the control program, the camera function of the electronic device is enhanced.

A method for controlling an external lens, applicable to a main device to control a first lens module connected thereto is provided in present invention, wherein the main device provides power and storage medium for the first lens module. First, the first lens module is connected to the main device. A control program is downloaded from a memory unit of the first lens module and installed in the main device. Then, the control program is used to allow the main device to receive a control operation, accordingly control the first lens module to execute a camera function, and finally display an execution result of the first lens module executing the camera function.

In one embodiment of the present invention, the step of downloading the control program from the memory unit of the first lens module and installing the control program in the main device comprises detecting an operating system executed by the main device, and accordingly downloading the control program corresponding to the operating system from the memory unit of the first lens module to the main device and installing the control program in the main device.

In one embodiment of the present invention, the step of downloading the control program from the memory unit of the first lens module and installing the control program in the main device comprises displaying an installing interface of the control program of the first lens module at the main device. The installing interface includes a plurality of options corresponding to a plurality of operating systems. Then, the step further comprises receiving a selecting operation for one of the options, and accordingly downloading the control program corresponding to the selecting operation from the memory unit of the first lens module and installing the downloaded control program in the main device.

In one embodiment of the present invention, before the step of downloading the control program from the memory unit of the first lens module and installing the downloaded control program in the main device, the method further comprises receiving an installing request sent by the first lens module. When a confirming operation for the installing request is received, the control program is downloaded from the memory unit of the first lens module and installed in the main device.

In one embodiment of the present invention, the step of the main device receiving the control operation, controlling the first lens module to execute the camera function according to the control operation, and displaying the execution result of the first lens module executing the camera function by using the control program is that the control program sends a corresponding control command to the first lens module based on the control operation. The first lens module then executes the camera function corresponding to the control command and transmits the execution result of the camera function to the main device. Finally, the control program displays the execution result transmitted from the first lens module.

In one embodiment of the present invention, the camera function includes auto-focusing, focal length adjusting, shutter triggering and adjustment in size, color or white balance of the image captured by the first lens module.

In one embodiment of the present invention, the step of receiving the control operation, controlling the first lens module to execute the camera function according to the control operation, and displaying the execution result of the first lens module executing the camera function by using the control program is that the control program sends a corresponding capturing command to the first lens module based on the control operation. The first lens module captures an image according to the capturing command and transmits the image to the main device. Finally, the control program executes an image processing to the image transmitted from the first lens module based on the control operation, and displays the processed image. The aforesaid image processing includes adjusting size, color or white balance of the image captured by the first lens module.

In one embodiment of the present invention, after the control program is installed in the main device, the method further connects a second lens module to the first lens module, receives the control operation, controls the first lens module and the second lens module to execute the camera function through the first lens module according to the control program, and displays the execution result of the first lens module and the second lens module executing the camera function by using the control program.

In one embodiment of the present invention, after the second lens module is connected to the first lens module, the method further downloads the control program of the second lens module from the memory unit of the second lens module and installs the downloaded control program in the main device through the first lens module, and accordingly controls the second lens module to execute the camera function.

In one embodiment of the present invention, in the step of receiving the control operation, controlling the first lens module to execute the camera function according to the received control operation, and displaying the execution result of the first lens module executing the camera function by using the control program, an operating interface of the control program is displayed, in which the operating interface comprising a plurality of function buttons corresponding to a plurality of camera functions. When receiving a selecting operation for one of the function buttons, the first lens module is accordingly controlled to execute the camera function selected by the selecting operation. The execution result of the camera function executed by the first lens module is then displayed on the operating interface.

The present invention provides a system for controlling an external lens, in which the system comprises a main device and a first lens module. The main device is configured to use a control program to receive a control operation and send a corresponding control command according to the received control operation. The first lens module comprises a first connecting interface, a first image capturing unit and a first processing unit. The first connecting interface is connected to the main device and configured to receive the control command sent by the main device. The first image capturing unit is configured to capture a first image. The first memory unit is configured to store the control program. The first processing unit is coupled to the first connecting interface, the first image capturing unit and the first memory unit, and configured to execute a camera function corresponding to the control command, transmit an execution result of the camera function to the main device through the first connecting interface, so as to display the execution result by the main device. When the first lens module is connected to the main device through the first connecting interface, the main device downloads the control program from the first memory unit of the first lens module and installs the control program therein.

In one embodiment of the present invention, the first lens module further comprises a detecting unit. When the first lens module is connected to the main device through the first connecting interface, the detecting unit detects an operating system executed by the main device.

In one embodiment of the present invention, the main device comprises a display unit and an operating unit. The display unit is configured to display an installing interface of the control program of the first lens module, in which the installing interface comprises a plurality of options corresponding to a plurality of operating systems. The operating unit is configured to receive a selecting operation for one of the options, accordingly download the control program corresponding to the options from the first memory unit of the first lens module, and install the control program in the main device.

In one embodiment of the present invention, the system further comprises a second lens module, which comprises a second connecting interface, a second image capturing unit and a second processing unit. The second connecting interface is connected to the first lens module and configured to receive the control command sent by the main device through the first lens module. The second image capturing unit is configured to capture a second image. The second memory unit is configured to store the control program. The second processing unit is coupled to the second connecting interface, the second image capturing unit and the second memory unit, and configured to execute a camera function corresponding to the control command, transmit the execution result of the camera function to the main device, so as to display the execution result by the main device.

Based on the above, the method and system for controlling an external lens of present invention automatically install a suitable control program in the main device which the external lens is connected to, so that the user of the main device can use the control program to control the operation of the external lens. Accordingly, the camera function of the main device is enhanced and the usage convenience is also increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Current portable electronic device is generally equipped with battery and memory having high capacity. The present invention applies these existing resources of the portable electronic device to an external lens, so as to effectively improve the camera function of the portable electronic device with lowest cost. When the external lens is connected to the portable electronic device, a suitable control program is automatically detected and installed, such that a user can control the external lens to execute the various camera functions by using the operating interface provided by the control program. Accordingly, the usage convenience can be increased.

Figure 1:
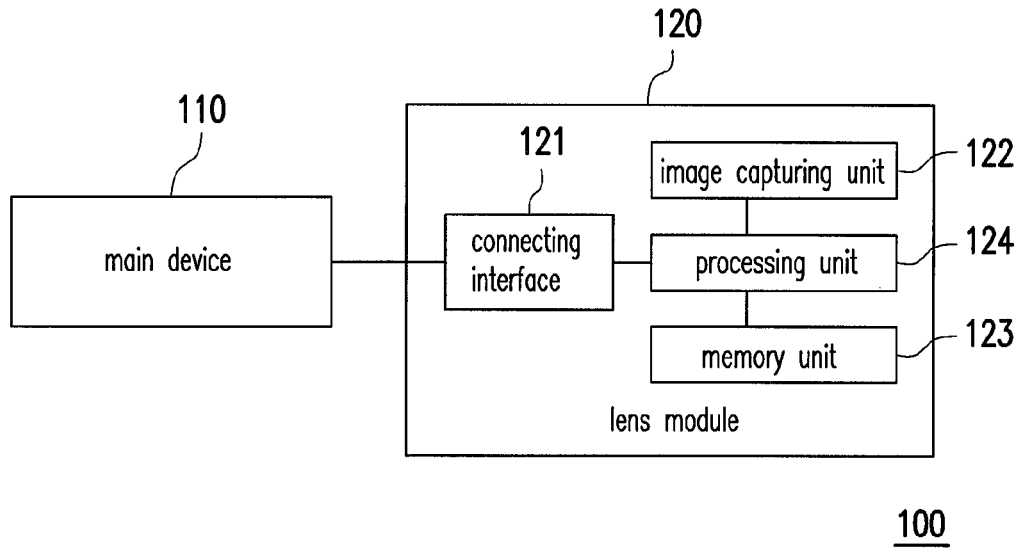
FIG. 1 is a block diagram showing the system for controlling an external lens according to an embodiment of the present invention.

FIG. 1 is a block diagram showing the system for controlling an external lens according to an embodiment of the present invention. Referring to FIG. 1, the system 100 of the embodiment includes a main device 110 and a lens module 120. The lens module 120 is connected to the main device 110. The main device 110 can provide power and storage medium for the lens module 120 so that the lens module 120 can execute camera functions and store captured images.

Preferably, the main device 110 can be, for example, a portable electronic device such as a mobile phone, a personal digital assistant, a navigation device, a digital camera, a notebook, or a tablet, which is supplied with a battery or an external power source and is equipped with a storage device such as a hard disc drive, a memory, or a memory card with high capacity.

The lens module 120 includes a connecting interface 121, an image capturing unit 122 and a processing unit 124, in which the lens module 120 is connected to the main device 110 through the connecting interface 121, so as to receive a control command sent by the main device 110 and transmit the captured image to the main device 110. Preferably, the connecting interface 121 can be, for example, universal serial bus (USB), IEEE1394, or an interface such as parallel port or serial port. The connecting interface 121 can also be compatible with the interface of the socket of various memory cards such as secure digital (SD) memory card, or micro secure digital (Micro SD) memory card. Thus, the connecting interface 121 can be inserted to the memory card socket of the main device 110 for transmitting data to the main device 110.

The image capturing unit 122 can be, for example, a device including an optical fixed-focus lens or optical zooming lens and a photosensitive component such as charge coupled device (CCD) or complementary metal-oxide semiconductor (CMOS) component, which can be used for capturing images.

The memory unit 123 is, for example, random access memory (RAM), read-only memory (ROM), flash memory, compact flash (CF), secure digital (SD) memory card, memory stick (MS) memory card or other kinds of memory cards, which is not limited thereto. The memory unit 123 is used to store the control program of the lens module 120.

Preferably, the processing unit 124 can be, for example, central processing unit (CPU) or other programmable microprocessor, digital signal processor (DSP), programmable controller, application specific integrated circuit (ASIC), programmable logic device (PLD) or the like. The processing unit 124 is respectively coupled to the connecting interface 121, image capturing unit 122 and the memory unit 123, and can execute the corresponding camera function according to the control command received by the connecting interface 121.

Figure 2:
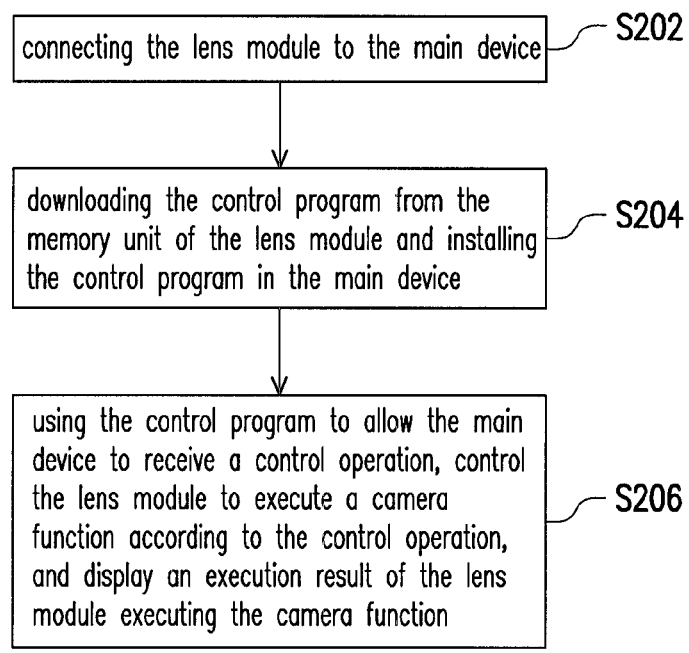
FIG. 2 is a flow diagram showing the method for controlling an external lens according to an embodiment of the present invention.

More specifically, FIG. 2 is a flow diagram showing the method for controlling an external lens according to an embodiment of the present invention. Referring to FIG. 2, the method of the embodiment is adapted to the system 100 in FIG. 1. The details of the method are described accompanying with the elements in FIG. 1 as follows.

First, in step S202, the lens module 120 is connected to the main device 110 by user, in which the lens module 120 is connected to the corresponding interface of the main device 110 through the connecting interface 121 disposed thereon. For instance, the lens module 120 may be connected to the main device 110 through a USB interface or inserted into a memory card socket of the main device 110 through a memory card interface.

As soon as the lens module 120 is connected to the main device 110, the main device 110 automatically downloads the control program of the lens module 120 from the memory card unit 123 of the lens module 120 and installs the control program therein in the step S204. In detail, while the lens module 120 is connected to the main device 110, the main device 110, for example, communicates with the processing unit 124 of the lens module 120 through the connecting interface 121, so as to download the control program of the lens module 120 from the memory unit 123, and automatically proceeds to the installing step after the control program is downloaded.

After the installation of the control program is completed, in the step S206 the main device 110 can receive user's control operation by utilizing the control program, and accordingly control the lens module 120 to execute a camera function, and display an execution result of the lens module 120 executing the camera function. In detail, for example, an operating interface of the control program is displayed on the screen (not shown) when the main device 110 executes the control program for the user to operate the lens module 120. The operating interface, for example, displays a plurality of function buttons corresponding to various camera functions of the lens module 120.

Figure 3:
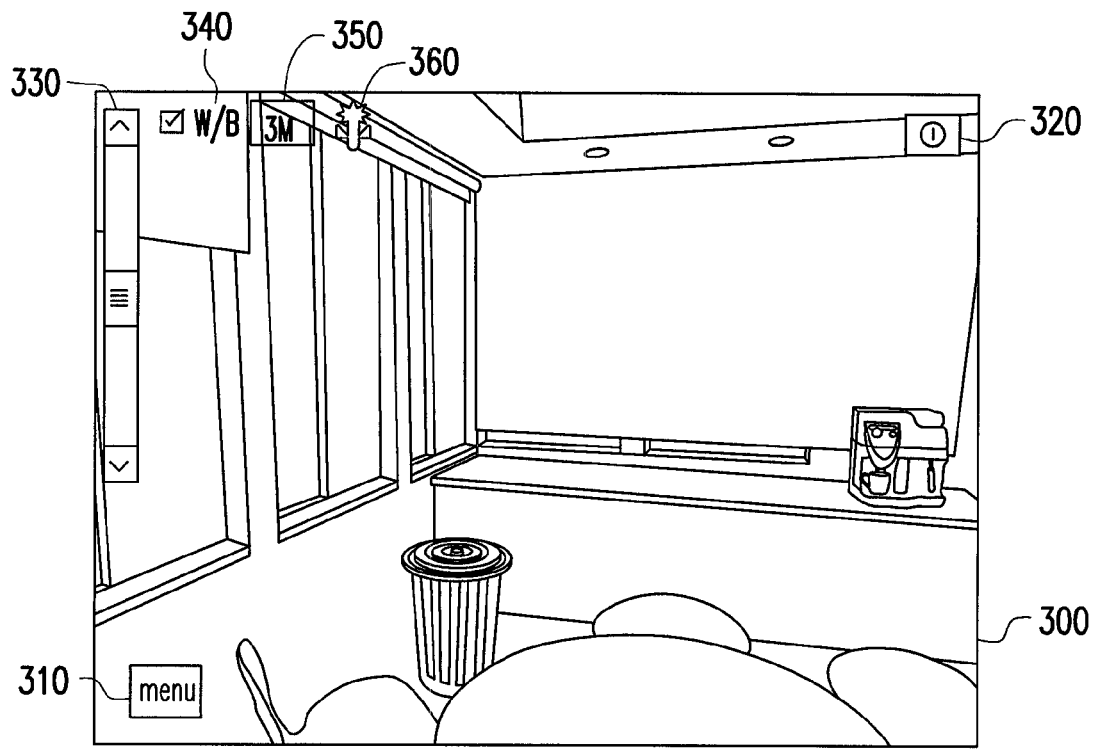
FIG. 3 is a schematic view of the operating interface of the control program according to one embodiment of the invention.

For instance, FIG. 3 is a schematic view of the operating interface of the control program according to one embodiment of the invention. For example, when the user opens the operating interface 300, the main device 110 correspondingly issues a start command to the lens module 120 through the connecting interface 121 to activate the image capturing unit 122 of the lens module 120 to capture real-time images. The real-time image is transmitted to the main device 110 through the connecting interface 121, and instantly displayed on the operating interface 300 by the main device 110. In addition, the main device 110 further displays a plurality of function buttons on the operating interface 300. The function buttons comprises, for example, a menu button 310 for calling a main menu, a shutter button 320 for triggering the shutter, a zooming button 330 for adjusting the focal length, a white balancing button 340 for adjusting the white balance of image, a size button 350 for adjusting the size of captured image, and a macro button 360 for starting a macro mode.

When the user utilizes the operating unit of the main device 110 (not shown, e.g. a keyboard or a mouse) to execute a control operation on the operating interface (for example, pressing one of the function buttons), the control program operates according to the control operation and sends a corresponding control command. The lens module 120 then executes the camera function corresponding to the received control command and transmits the execution result to the main device 110 for display thereon. The camera function includes auto-focusing, focal length adjustment, shutter triggering, and adjustment of size, color or white balance of image captured by the lens module 120, which is not limited thereto.

It is to be noted that the portable electronic devices in the current market support for multi-task processing, and it means that multiple tasks may be executed at the same time and cause heavy workload for the processor of the mobile device. If the device has to further process the image captured by the lens module 120, the execution efficiency will be affected. Accordingly, in the embodiment, all of the camera functions are, for example, processed by the processing unit 124 disposed in the lens module 120, and then the processed result are transmitted to the main device 110. The main device 110 is merely used for receiving the control operation and transmitting the control command, so that the workload of the main device 110 can be reduced and the efficiency can be maintained.

On the contrary, to reduce the cost of the lens module 120, in other embodiment, the processing unit 124 of the lens module 120 is merely used for processing fundamental functions such as image capturing, focal length adjustment or the like. As for the image processing functions that require complicated calculation (for example, adjustment of size, color or white balance of the image), they can be done by the processor which has better performance and is disposed in the main device 110. For instance, if the user wants to capture a particular image with filter effects, the user can select a corresponding option in the operating interface of the control program, and then the control program sends a capturing command to the lens module 120 for control of capturing an image and transmitting the capture image to the main device 110. When the main device 110 receives the image, the control program processes filtering to the image. Finally, an image processed with a particular filtering effect is obtained and displayed on the screen of the main device 110. The processing functions of the main device 110 and the lens module 120 can be chosen by the user according to actual requirements, which is not limited herein.

In order to enable the external lens of the present invention to be used in different types of portable electronic devices, in an embodiment, the invention further includes automatic detection for the operating system of the main device while the external lens is connected to the main device, and further installation of a suitable control program in the main device. Another embodiment is given below for further illustration.

Figure 4:
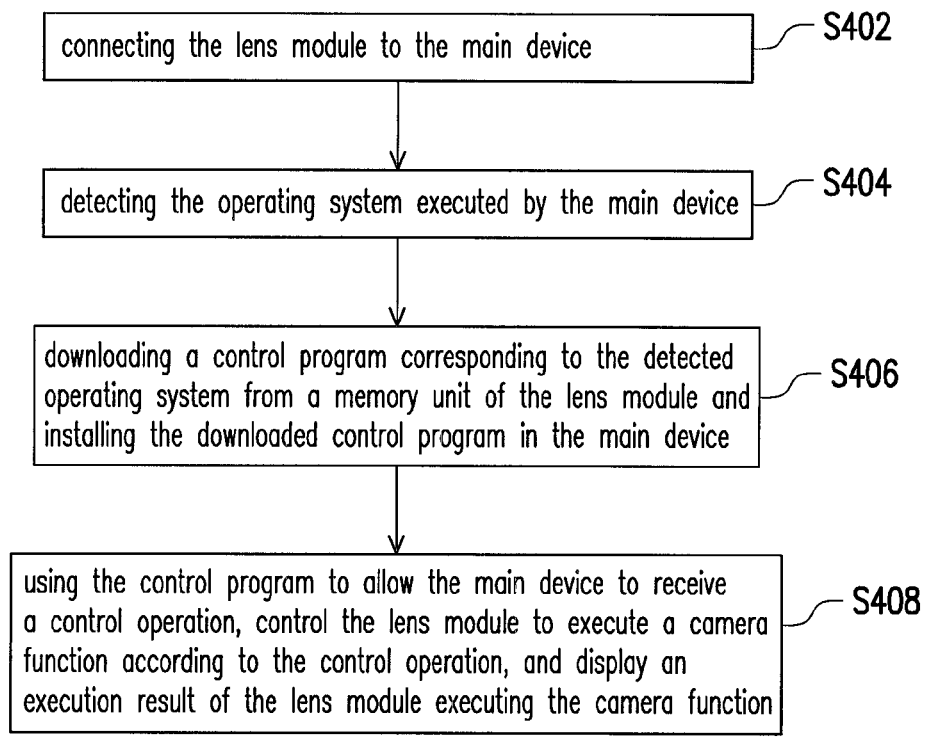
FIG. 4 is a flow diagram showing the method for controlling an external lens according to an embodiment of the present invention.

FIG. 4 is a flow diagram showing the method for controlling an external lens according to an embodiment of the present invention. Referring to FIG. 4, the method of the embodiment is adapted to the system 100 in FIG. 1. The details of the method are described as follows accompanying with the elements in FIG. 1.

First, the lens module 120 is connected to the main device 110 by user in the step S402, in which the lens module 120 is connected to the corresponding interface on the main device 110 through the connecting interface 121 configured therein.

While being connected to the main device 110, the lens module 120, for example, detects the operating system executed by the main device 110 through a detecting unit (not shown) in the step S404. The detecting unit is, for example, a program which is able to send an inquiring packet to ask for or test the operating system of the main device 110. The operating system is, for example, Windows Mobile, Android or iOS, but is not limited thereto. In the embodiment, before the lens module 120 leaves the factory, the control program adapted to the operating system is installed in the memory unit 123 of the lens module 120, so as to be automatically installed to enable the lens module 120 to be compatible with various types of electronic devices.

Then, in the step S406 the main device 110 downloads the control program corresponding to the detected operating system from the memory unit 123 of the lens module 120, and installs the downloaded control program therein. For example, when the operating system is detected by the lens module 120, the processing unit 124 can send a transmitting request to the main device 110 to provide the main device 110 with the address of the control program corresponding to the operating system, so that the main device 110 can find the control program in the memory unit 123 of the lens module 120 and proceed to the further download and installation.

After the installation of the control program is completed, in the step S408 the main device 110 may receive the control operation of the user by utilizing the control program and further control the lens module 120 to execute a camera function according to the received control operation, and display an execution result of the lens module 120 executing the camera function. The details of step S408 in the present embodiment are the same as or similar to those of step S206 in the above-described embodiment, thus will not be repeated herein.

Except auto-detecting, a manual selecting manner is also provided for the user to install the control program in present invention. In the embodiment, the main device 110 may, for example, display an installing interface of the control program of the lens module 120 on the screen. The installing interface includes a plurality of options corresponding to a plurality of operating systems for the user to select. The main device 110 further receives a selecting operation for one of the options from the user, accordingly downloads the control program corresponding to the selected option from the memory unit 123 of the lens module 120, and installs the control program therein.

Figure 5:
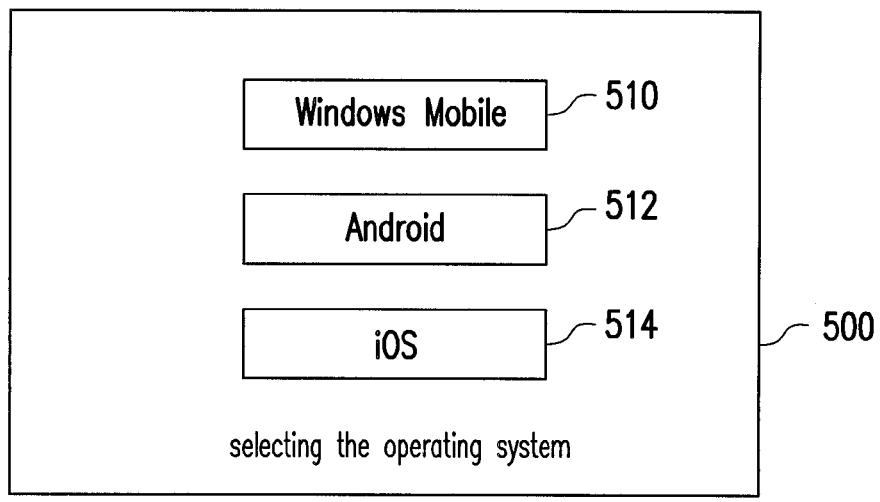
FIG. 5 is a schematic view of the installing interface of the control program according to one embodiment of the invention.

For instance, FIG. 5 is a schematic view of the operating interface of the control program according to one embodiment of the invention. Referring to FIG. 5, the installing interface 500 of the present embodiment includes a plurality of options of operating systems such as an option of Windows Mobile 510, an option of Android 512 and an option of iOS 514. When the user presses one of the options, the main device 110 searches for the corresponding control program from the memory unit 123 of the lens module 120 and executes the downloading and installing steps.

In n another embodiment, after the lens module is connected to the main device and before the control program is installed, the lens module may send an installing request to the main device to ask the user whether to install the control program. Another embodiment is given below for further illustration.

Figure 6:
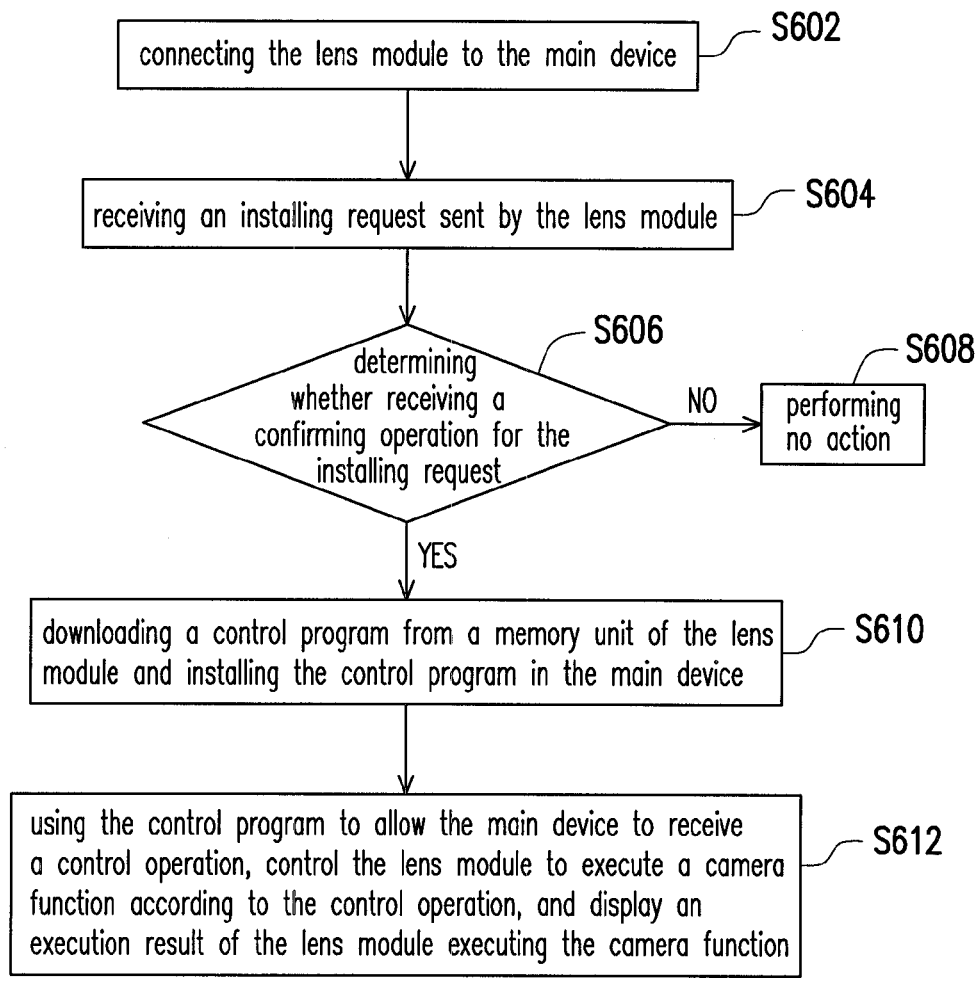
FIG. 6 is a flow diagram showing the method for controlling an external lens according to an embodiment of the present invention.

FIG. 6 is a flow diagram showing the method for controlling an external lens according to an embodiment of the present invention. Referring to FIG. 6, the method of the embodiment is adapted to the system 100 in FIG. 1. The details of the method are described as follows accompanying with the elements in FIG. 1.

First, in the step S602 the lens module 120 is connected to the main device 110, in which the lens module 120 is connected to the corresponding interface on the main device 110 through the connecting interface 121 configured thereon.

In the meantime of being connected to the main device 110, the lens module 120 sends an installing request to the main device 110 through the connecting interface 121 in the step S604. After receiving the installing request, the main device 110 in the step S606, for example, displays a corresponding message to inform the user and detects whether a confirming operation for the installing request from the user is received. In the step S608, no action is performed if the main device 110 does not receive the confirming operation.

On the contrary, as soon as the main device 110 receives the confirming operation, main device 110 in the S610 automatically downloads the control program of the lens module 120 from the memory card unit 123 of the lens module 120 and installs the control program. After the installation of the control program is completed, the main device 110 can receive the user's control operation through the control program, and accordingly control the lens module 120 to execute a camera function, and display an execution result of the lens module 120 executing the camera function in the step S612. The details of steps S610 and S612 in the present embodiment are the same as or similar to those of steps S204 and S206 in the above-described embodiment, thus will not be repeated herein again.

It is noted that except configuring the external lens on the portable electronic device to enhance the camera function, in another embodiment of the invention, an extra external lens may be connected to the external lens. Through the cooperation of the two external lenses, a capture for a three dimensional image can be realized. Another embodiment is given below for further illustration.

Figure 7:
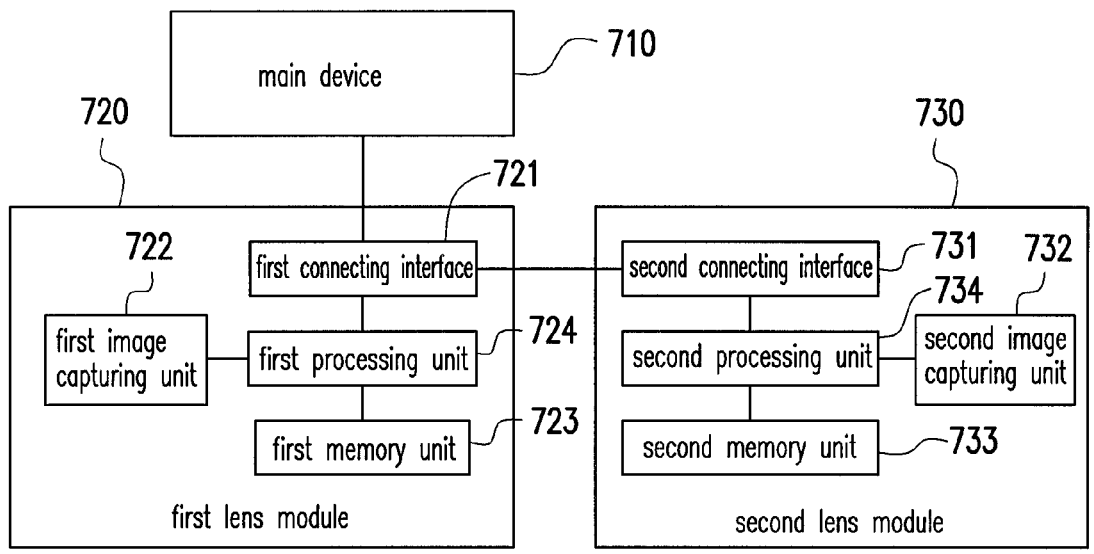
FIG. 7 is a block diagram showing the system for controlling an external lens according to an embodiment of the present invention.

FIG. 7 is a block diagram showing the system for controlling an external lens according to an embodiment of the present invention. Referring to FIG. 7, the system 700 of the embodiment includes a main device 710, a first lens module 720 and a second lens module 730, wherein the first lens module 720 is connected to the main device 710, and the second lens module 730 is connected to the first lens module 720. Both the power and the storage medium of the first lens module 720 and the second lens module 730 are supplied by the main device 710, so as to execute the camera function and store the captured image.

The structure and function of the first lens module 720 and the second lens module 730 in this embodiment are, for example, the same as or similar to the lens module 120 in above-mentioned embodiment, which means that the functions of the first connecting interface 721, the first image capturing unit 722, the first memory unit 723 and the first processing unit 724 of the first lens module 720, and the functions of the second connecting interface 731, the second image capturing unit 732, the second memory unit 733 and the second processing unit 734 of the second lens module 730 respectively correspond to the functions of the connecting interface 121, the image capturing unit 122, the memory unit 123 and the processing unit 124 of the lens module 120, so the detailed contents are not repeated herein.

The difference from the previous embodiment is that except that the first lens module 720 is connected to the main device 710 through the first connecting interface 721, it is also connected to the second connecting interface 731 of the second lens module 730 through the first connecting interface 721. The first connecting interface 721 comprises, for example, two connectors having the same or different specifications and can be used to connect two devices, which is not limited thereto.

Figure 8:
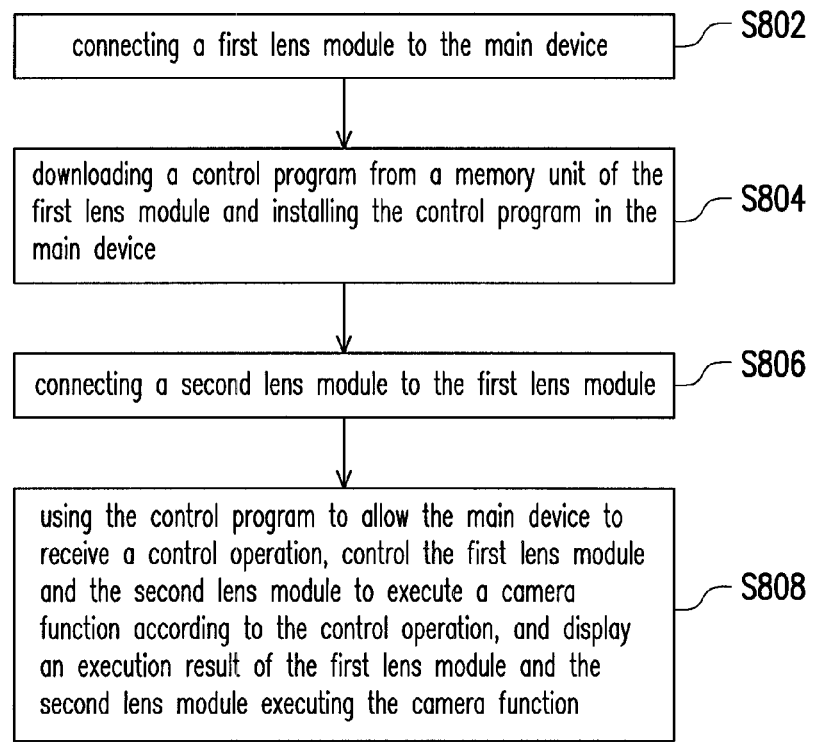
FIG. 8 is a flow diagram showing the method for controlling an external lens according to an embodiment of the present invention.

FIG. 8 is a flow diagram showing the method for controlling an external lens according to an embodiment of the present invention. Referring to FIG. 8, the method of the embodiment is adapted to the system 700 in FIG. 7. The details of the method are described as follows accompanying with the elements in FIG. 7.

First, the lens module 720 is connected to the main device 710 in step S802, in which the first lens module 720 is connected to the corresponding interface on the main device 710 through the first connecting interface 721 configured thereon. In the meantime of the first lens module 720 being connected to the main device 710, the main device 710 automatically downloads the control program of the first lens module 720 from the first memory card unit 723 of the first lens module 720 and installs the downloaded control program therein in the step S804. The details of steps S802 and S804 in the present embodiment are the same as or similar to those of steps S204 and S206 in the above-described embodiment, thus will not repeated herein again.

Then, in step S806 the second lens module 730 is connected to the first lens module 720, in which the second lens module 730 is connected to the first connecting interface 721 of the first lens module 720 through the second connecting interface 731 configured thereon. Since the first lens module 720 and the second lens module 730 used in present embodiment are completely the same, there is no need to install a control program directed to the second lens module 730.

Finally, after the installing of the control program is completed, the main device 710 in step S808 may use the control program to receive the control operation of the user, accordingly control the first lens module 720 and the second lens module 730 to execute a camera function, and display an execution result of the first lens module 720 and the second lens module 730 executing the camera function on the screen of the main device 710. In detail, for example, an operating interface of the control program is displayed on the screen (not shown) when the main device 710 executes the control program for the user to operate the first lens module 720 and the second lens module 730. Through the control of the first lens module 720 and the second lens module 730, the main device 710 may realize various camera functions. For example, the main device 710 may combine the images captured by the two lens modules so as to generate a three dimensional image.

It is noted that, in another embodiment, if the first lens module and the second lens module are not the same devices, different control programs are required to be installed. In the meantime of the second lens module 730 being connected to the first lens module 720, the main device 710 downloads the control program of the second lens module 730 from the second memory unit 733 of the second lens module 730 through the first lens module 720, installs the control program therein, and accordingly controls the second lens module 730 to execute the required camera function.

To sum up, the method and system for controlling an external lens of the present invention automatically detects the operating system of the main device so as to install a suitable control program and enable the main device to control the external lens to execute various camera functions by using the control program. Additionally, in present invention, since both the power and the storage medium for the captured image of the external lens are provided by the main device, the present invention may save the cost for purchasing the lens while enhancing the camera function of the main device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for controlling an external lens, applicable to a main device to control a first lens module externally connected thereto, wherein the main device provides power and storage medium for the first lens module, the method comprising:

when the first lens module is externally connected to an external connecting interface of the main device, the first lens module detecting an operating system executed by the main device and providing a control program corresponding to the operating system, and the main device downloading the control program from a memory unit of the first lens module and installing the control program therein, wherein the external connecting interface is externally disposed on the main device, and the first lens module is detachable from the main device, wherein the control program downloaded from the memory unit enables the main device to control the first lens module; and using the control program to allow the main device to receive a control operation, and control the first lens module to execute a camera function according to the control operation, and display an execution result of the first lens module executing the camera function.

2. The method for controlling an external lens as claimed in claim 1, wherein the step of downloading the control program corresponding to the operating system from the memory unit of the first lens module and installing the control program in the main device comprises:
   displaying an installing interface of the control program of the first lens module at the main device, wherein the installing interface comprising a plurality of options corresponding to a plurality of operating systems; and
   receiving a selecting operation for one of the options, and accordingly downloading the control program corresponding to the selecting operation from the memory unit of the first lens module and installing the downloaded control program in the main device.

3. The method for controlling an external lens as claimed in claim 1, wherein the step of downloading the control program corresponding to the operating system from the memory unit of the first lens module and installing the control program in the main device further comprises:
   receiving an installing request sent by the first lens module; and
   receiving a confirming operation for the installing request, accordingly downloading the control program from the memory unit of the first lens module, and installing the control program in the main device.

4. The method for controlling an external lens as claimed in claim 1, wherein the step of the main device receiving the control operation, controlling the first lens module to execute the camera function according to the control operation, and displaying the execution result of the first lens module executing the camera function by using the control program comprises:
   the control program sending a corresponding control command to the first lens module based on the control operation;
   the first lens module executing the camera function corresponding to the control command, and transmitting the execution result of the camera function to the main device; and
   the control program displaying the execution result transmitted from the first lens module.

5. The method for controlling an external lens as claimed in claim 1, wherein the camera function comprises auto-focusing, focal length adjusting, shutter triggering and adjustment in size, color or white balance of the image captured by the first lens module.

6. The method for controlling an external lens as claimed in claim 1, wherein the step of receiving the control operation, controlling the first lens module to execute the camera function according to the control operation, and displaying the execution result of the first lens module executing the camera function by using the control program comprises:
   the control program sending a corresponding capturing command to the first lens module based on the control operation;
   the first lens module capturing an image according to the capturing command, and transmitting the captured image to the main device; and
   the control program executing an image processing to the image transmitted from the first lens module based on the control operation, and displaying the processed image.

7. The method for controlling an external lens as claimed in claim 6, wherein the image processing comprises adjusting size, color or white balance of the image captured by the first lens module.

8. The method for controlling an external lens as claimed in claim 6, wherein after the control program is installed in the main device, the method further comprises:
   connecting a second lens module to the first lens module; and
   receiving the control operation, controlling the first lens module and the second lens module to execute the camera function through the first lens module according to the control operation, and displaying the execution result of the first lens module and the second lens module executing the camera function by using the control program.

9. The method for controlling an external lens as claimed in claim 8, wherein after the second lens module is connected to the first lens module, the method further comprises:
   downloading the control program of the second lens module from the memory unit of the second lens module, installing the downloaded control program in the main device through the first lens module, and accordingly controlling the second lens module to execute the camera function.

10. The method for controlling an external lens as claimed in claim 1, wherein the step of receiving the control operation, controlling the first lens module to execute the camera function according to the received control operation, and displaying the execution result of the first lens module executing the camera function by using the control program comprises:
    displaying an operating interface of the control program, wherein the operating interface comprising a plurality of function buttons corresponding to a plurality of camera functions;
    receiving a selecting operation for one of the function buttons, and accordingly controlling the first lens module to execute the camera function selected by the selecting operation; and
    displaying the execution result of the camera function executed by the first lens module on the operating interface.

11. A system for controlling an external lens, comprising:
    a main device, comprising an external connecting interface and configured to use a control program to receive a control operation, and accordingly send a corresponding control command through the external connecting interface, wherein the external connecting interface is disposed externally on the main device; and
    a first lens module, comprising:
      a first connecting interface, connected to the main device, and configured to receive the control command sent by the main device;
      a first image capturing unit, configured to capture a first image;
      a first memory unit, configured to store the control program;
      a first detecting unit, configured to detect an operating system executed by the main device connected to the first lens module and provide a control program corresponding to the operating system; and
      a first processing unit, coupled to the first connecting interface, the first image capturing unit and the first memory unit, and configured to execute a camera function corresponding to the control command, transmit an execution result of the camera function to the main device through the first connecting interface, so as to display the execution result by the main device, wherein
    when the first lens module is externally connected to the external connecting interface of the main device through the first connecting interface, the detecting unit detects the operating system executed by the main device, and the main device downloads the control program from the first memory unit of the first lens module and installs the control program therein, wherein the control program downloaded from the memory unit enables the main device to control the first lens module, the first lens module is detachable from the main device.

12. The system for controlling an external lens as claimed in claim 11, wherein the main device comprises:
a display unit, configured to display an installing interface of the control program of the first lens module, wherein the installing interface comprising a plurality of options corresponding to a plurality of operating systems; and
an operating unit, configured to receive a selection operation for one of the options, accordingly download the control program corresponding to the options from the first memory unit of the first lens module, and install the control program in the main device.

13. The system for controlling an external lens as claimed in claim 11, further comprising:
a second lens module, comprising:
a second connecting interface, connected to the first lens module, and configured to receive the control command sent by the main device through the first lens module;
a second image capturing unit, configured to capture a second image;
a second memory unit, configured to store the control program; and
a second processing unit, coupled to the second connecting interface and the second image capturing unit, and configured to execute the camera function corresponding to the control command, transmit the execution result of the camera function to the main device, so as to display the execution result by the main device.

* * * * *